United States Patent [19]

Newsome

[11] Patent Number: 5,301,856
[45] Date of Patent: Apr. 12, 1994

[54] SUN VISOR ORGANIZER

[76] Inventor: Jack S. Newsome, 2228 S. Bundy Dr., Los Angeles, Calif. 90064

[21] Appl. No.: 924,959

[22] Filed: Aug. 5, 1992

[51] Int. Cl.$^5$ .............................................. B60R 7/05
[52] U.S. Cl. ................................. 224/312; 224/227; 296/97.5; 296/97.6; 248/447.2
[58] Field of Search ............... 224/311, 312, 42.42, 224/277, 282; 206/214, 223, 224, 371; 296/37.5, 37.7, 37.8, 97.5, 97.6, 97.8, 97.9, 97.12, 97.13; 248/447.1, 447.2, 450, 451

[56] References Cited

U.S. PATENT DOCUMENTS

| | | | |
|---|---|---|---|
| 2,181,324 | 11/1939 | Glover | 224/312 X |
| 2,458,125 | 1/1949 | Winkler | 296/97.6 X |
| 2,598,029 | 5/1952 | Baldwin | 224/312 |
| 2,673,670 | 3/1954 | Steele | 224/42.42 R |
| 2,839,860 | 6/1958 | Fry | 296/97.5 X |
| 3,016,262 | 1/1962 | Hunt | 224/312 X |
| 3,954,297 | 5/1976 | Linke et al. | 296/97.6 |
| 4,308,951 | 1/1982 | Walker, Jr. | 206/214 |
| 4,913,483 | 4/1990 | Jasso | 296/97.6 |

FOREIGN PATENT DOCUMENTS 8170645 10/1983 Japan ........................ 224/312

Primary Examiner—J. Casimer Jacyna
Attorney, Agent, or Firm—S. Michael Bender

[57] ABSTRACT

An office organizer comprising writing instruments, a calculator, note pad, a calendar, and so on is mounted on the conventional sun visor of a motor vehicle. The organizer includes a hinged panel permitting it to be swiveled to an open position shielding the side window of the vehicle. In an alternatively preferred embodiment, a series of supplemental hinged panels are provided to increase the capacity of the organizer. The hinged panels preferably are transparent and suitably optically coated to provide a safe field of vision when they are unfolded and to afford protection from the harmful effects of sunlight.

10 Claims, 4 Drawing Sheets

SUN VISOR ORGANIZER

BACKGROUND OF THE INVENTION

1. Field of the Invention

The present invention relates generally to office organizers, and more particularly, to office organizers adapted to be mounted on the conventional sun visor of a vehicle.

2. Description of the Prior Art

Office organizers for use in vehicles generally are known. For example, U.S. Pat. No. 4,512,503 discloses an organizer comprising a main tray and a slidable tray for holding various items in individual compartments. The unit is attached to the seat of an automobile by strap fastener means. Similarly, in U.S. Pat. No. 4,832,241 there is shown an organizer for use in automobiles comprising a tray and a series of dividers for designing compartments in the tray. Here again, the unit is fastened to the automobile seat, however, in this case, the vehicle's seatbelt is suitably employed. Also, U.S. Pat. No. 4,811,981 discloses an organizer in the form of a unit insertable within the glove box interior space of an automobile. The unit comprises a pair of cooperating shelf portions which are adjustable relative to each other so as to fit a wide range of different vehicles.

None of the patented organizers mentioned above is capable of being mounted on the sun visor of the vehicle involved. Nor are they transparent to permit the driver to see through the organizer and therefore use it when the vehicle is being driven.

These important disadvantages are overcome and other advantages are achieved only by the present invention as will be made apparent from a study of the remainder of the specification which follows.

SUMMARY OF THE INVENTION

To achieve the foregoing and other advantages, the present invention, briefly described, provides an improved office organizer comprising writing instruments, a calculator, a note pad, a calendar, and so on, mounted on the conventional sun visor of a motor vehicle. The organizer includes a hinged panel permitting it to be swiveled to an open position shielding a side window. In an alternatively preferred embodiment, a series of supplemental hinged panels are provided to increase the capacity of the organizer. The hinged panels are transparent and suitably optically coated to provide a safe field of vision when they are unfolded and to afford protection from the harmful effects of sunlight.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least three preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved sun visor organizer which has all of the advantages of the prior art and none of the disadvantages.

It is another object of the present invention to provide a new an improved sun visor organizer which may be easily and efficiently manufactured and marketed.

It is a further objective of the present invention to provide a new and improved sun visor organizer which is of durable and reliable construction.

An even further object of the present invention is to provide a new and improved sun visor organizer which is susceptible of a low cost of manufacture with regard to both materials and labor, and which accordingly is then susceptible of low prices of sale to the consuming public, thereby making such sun visor organizer economically available to the buying public.

Still a further object of the present invention is to provide a new and improved sun visor organizer which provides in the apparatuses and methods of the prior art some advantage thereof, while simultaneously overcoming some of the disadvantages normally associated therewith.

Still yet a further object of the present invention is to provide a new and improved sun visor organizer capable of being mounted on the conventional sun visor of a vehicle.

Still a further object of the present invention is to provide a new and improved sun visor organizer comprising at least one transparent panel permitting the driver of the vehicle to use the organizer in a safe manner while driving.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a new and improved sun visor organizer embodying the principles and concepts of the present invention will be described.

Figure 1:
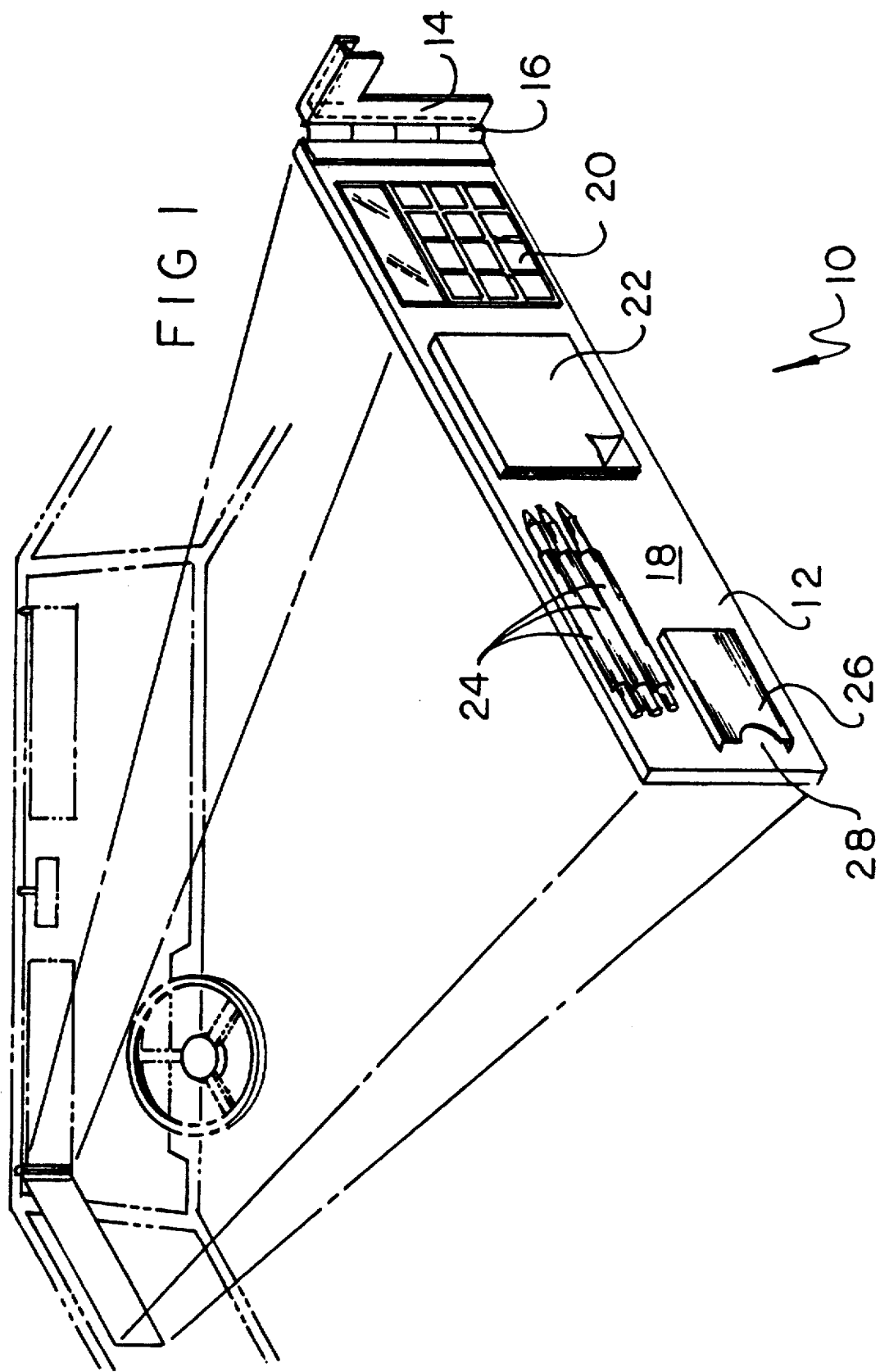
FIG. 1 is a partial perspective exploded view showing the first preferred embodiment of the invention as used in the interior of a vehicle.
Figure 2:
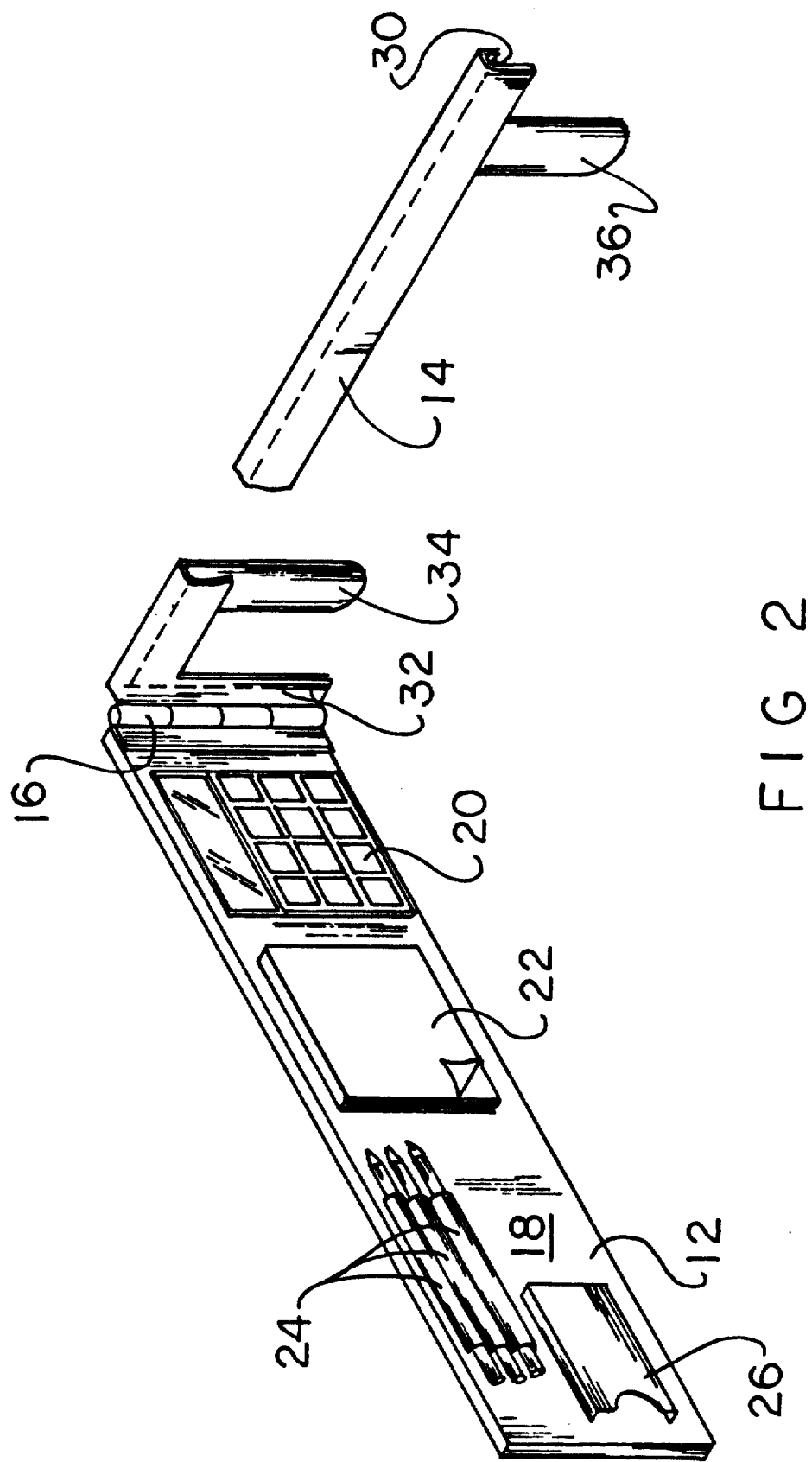
FIG. 2 is a perspective view in elevation of the embodiment of FIG. 1 showing the bracket assembly thereof partially broken away.

Turning initially to FIGS. 1 and 2, there is shown a first preferred form of the sun visor organizer of the invention generally designated by reference numeral 10. Organizer 10 comprises a main panel 12 attached to a bracket assembly 14 by means of hinge 16. In use (FIG. 1), the bracket assembly is clipped onto the conventional sun visor of a vehicle so that the main panel may be folded against the top surface of the vehicle's visor when the latter is in its normally unused position facing the inside of the roof of the vehicle. In this position, the organizer is folded shut in an unused condition. To use the organizer according to the invention, the vehicle sun visor is folded down generally parallel to the vehicle's windshield, and the main panel is unfolded via hinge 16 to the left approximately ninety degrees. In this, the open position of the organizer, the working surface 18 of the main panel is conveniently rendered accessible to the vehicle driver.

In the preferred embodiment, working surface 18 has suitably mounted thereon a collection of conventional articles useful to the driver especially if the driver uses the vehicle frequently in connection with his vocation. These include a battery operated calculator 20, a note pad 22, a group of pens, pencils or the like mounted in a corresponding series of cylindrical sleeves 24 suitably attached to the panel, and a rectangular shaped sleeve 26 having a notch 28 for receivably supporting business cards or the like.

In accordance with another important feature of the invention, the main panel 12 is fabricated of a stiff, durable, optically transparent plastic material (e.g. plastic sold under the Trademarks Plexiglass or Lexan) having a tinted optical coating applied thereto to in a suitable manner to filter out the harmful and glare producing components of sunlight. Thus, not only does the main panel serve as a sun visor on the top of the driver's side window, it also permits the driver to see through the portions of the panel unoccupied by the organizer work components described above thereby adding to the driver's safety.

As shown in FIGS. 1 and 2, main panel 12 preferably is rectangular in shape and suitably sized to be co-extensive generally with the standard equipment sun visor of a motor vehicle. Thus, the main panel has a longitudinal extent grater than its transverse extent more or less as illustrated.

As best seen in FIG. 2, bracket assembly 14 comprises a longitudinally extending channel portion 30 whose left side as viewed in FIG. 2 is integrally joined in a flush manner to the top of hinge plate 32. Downwardly depending, spaced clip members 34, 36 are integrally joined to the right side of the channel portion substantially as shown. The bracket assembly channel portion is suitably sized so that it may be easily clipped onto and securely fastened to the top edge of a vehicle sun visor. Because hinge 16 has its axis parallel to the transverse extent of both the main panel 12 and the bracket assembly 14 substantially as shown, the main panel is capable of being folded shut to lie across the sun visor in a juxtaposed manner when the vehicle sun visor is in the "up" or unused position. The organizer thus may be conveniently stored out of the way, and out of sight, when it is not being used.

Figure 3:
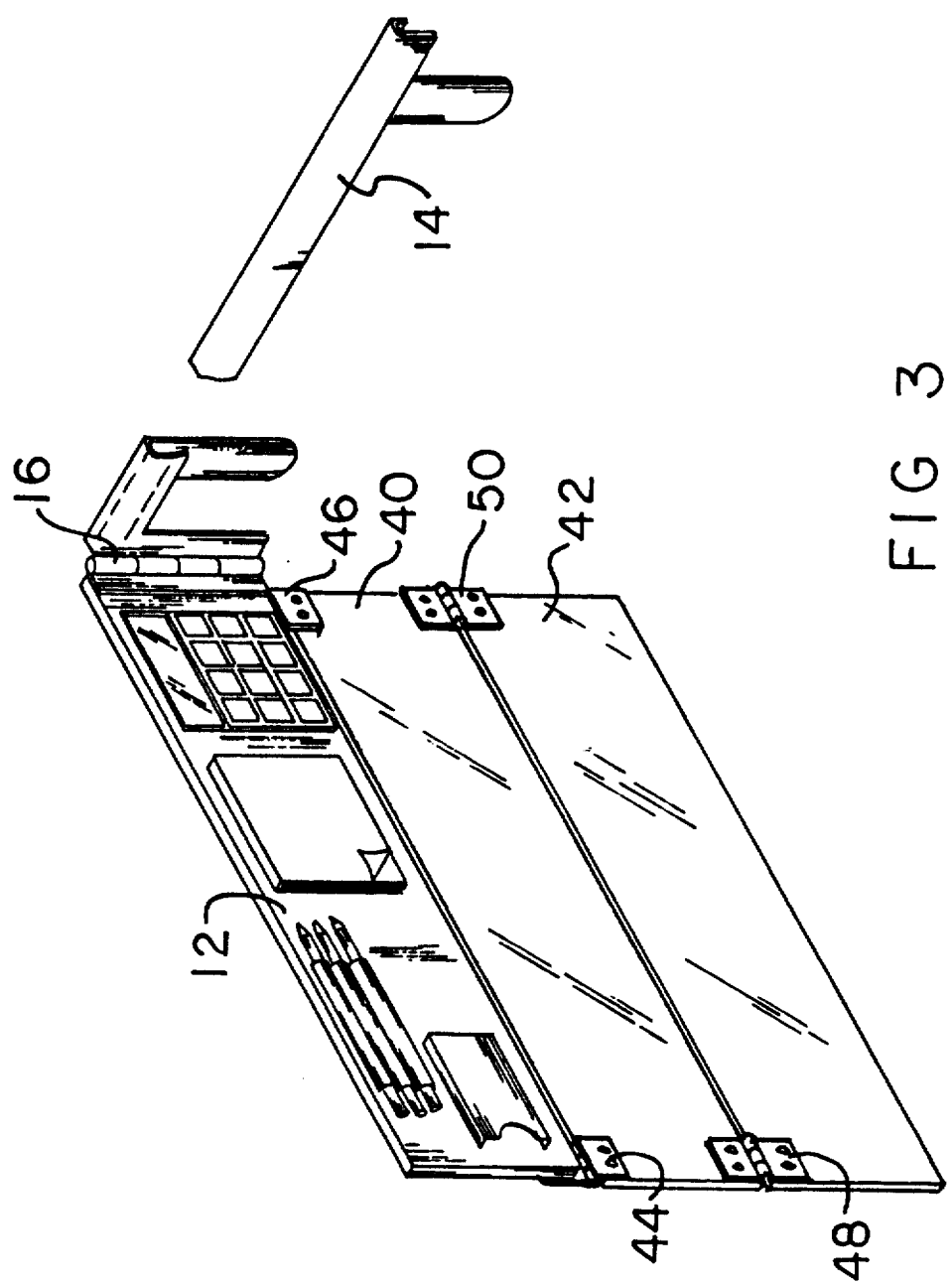
FIG. 3 is a perspective view in elevation of a second preferred embodiment of the invention.
Figure 4:
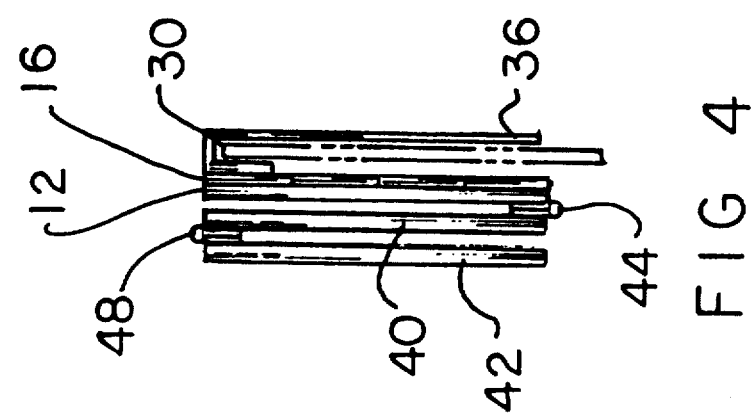
FIG. 4 is an end view in elevation of the embodiment of FIG. 3.

Turning to FIGS. 3 and 4, there is shown a second preferred exemplary embodiment of the invention wherein supplemental panels 40, 42 are attached to the main panel 12. Supplemental panel 40 is attached to the bottom longitudinal edge edge of the main panel by a pair of spaced hinges 44, 46 whereas the top longitudinal edge of supplemental panel 42 is attached to the bottom longitudinal edge of supplemental panel 40 via a second pair of spaced hinges 48, 50. By this arrangement, the supplemental panel 40 may be folded up to lie across the main panel 12 in a juxtaposed manner, and the supplemental panel 42 may be folded down to lie across supplemental panel 40 in a juxtaposed manner as shown to best advantage in FIG. 4. Consequently, when the supplemental panels and the organizer are not in use they may be compactly stowed away behind the vehicle's conventional standard equipment sun visor. When in use, it will be appreciated that the fold-down supplemental panels provide excellent protection from the sunlight and in this regard preferably are transparent and optically coated as described above with respect of the embodiment of FIGS. 1 and 2.

Figure 5:
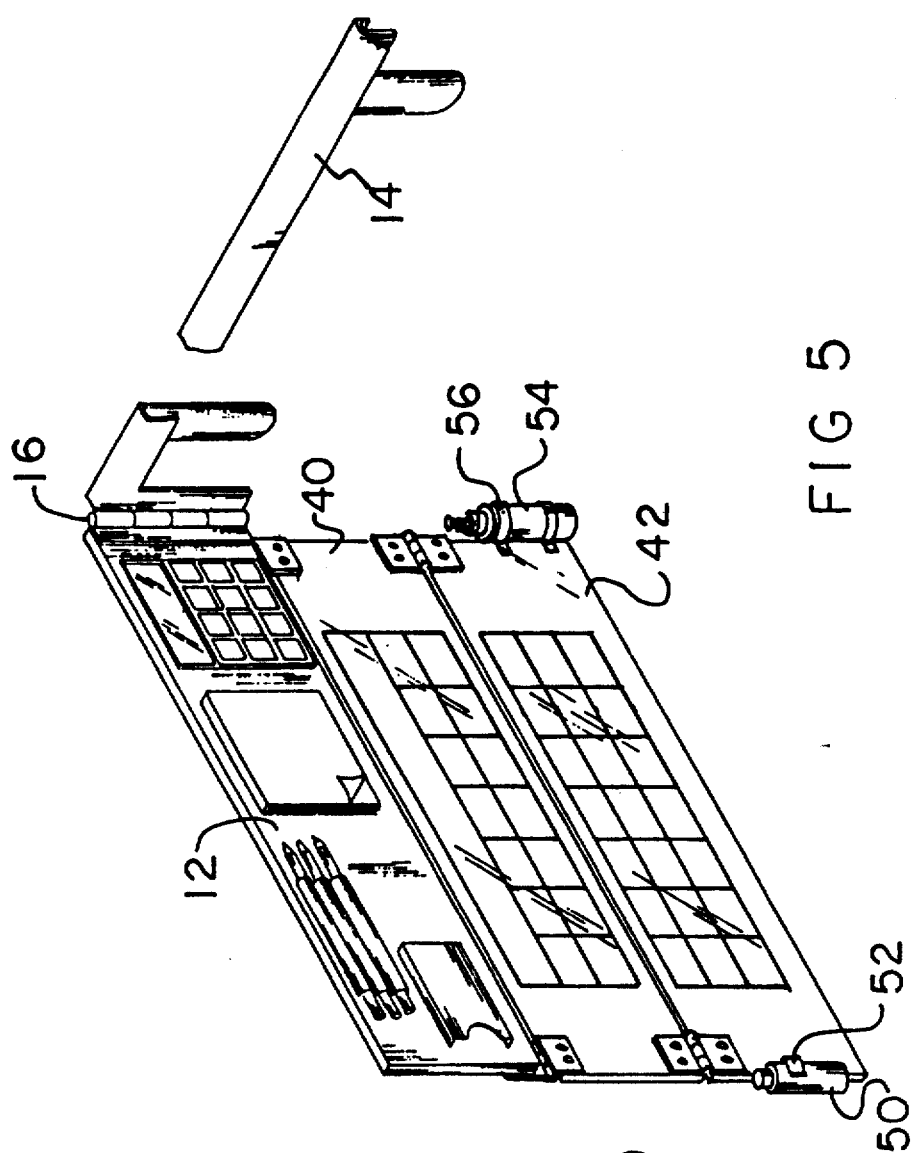
FIG. 5 is a perspective view in elevation of a third preferred embodiment of the invention. the invention taken along line 5—5 of FIG. 4.
Figure 6:
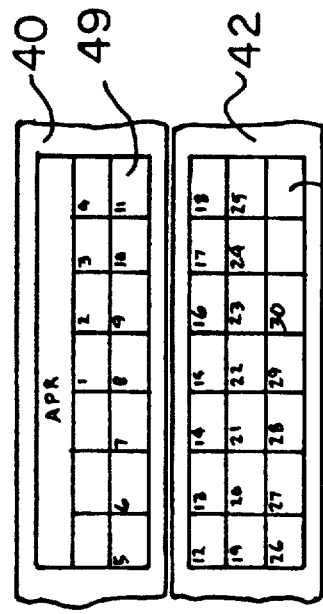
FIG. 6 is a partial view in elevation of a portion of the third preferred embodiment of the invention.

If desired, the first and second supplemental panels 40, 42 may have permanent indicia displayed thereon designed to be a useful adjunct to the various articles carried by the main panel of the organizer. Thus, as shown in FIGS. 5 and 6, the first supplemental panel 40 has displayed thereon in a suitable manner, a grid representing the days in the month. Appointments for a particular day of the month may be marked on the "monthly" grid 49 by means of a marker 50 carried in a clip 52 on the left edge of the supplemental panel 42. A liquid cleaner for removing the markings produced by the marker may be stored in a suitable dispenser 54 supported by a similar clip 56 supported on the right side of the supplemental panel 42 as diagrammatically illustrated in FIG. 5. A calendar 58 for an entire year (or a perpetual calendar) preferably is permanently displayed in a suitable manner on the second supplemental panel 42.

From the above, it will be appreciated that the present invention discloses a unique sun visor attachment that not only serves as a convenient organizer to enable drivers to accomplish useful work while they are in their vehicle, but moreover, serves the dual function of providing the safety of additional sun visor protection against sunlight.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed as being new and desired to be protected by Letters Patent of the United States is as follows:

1. A new and improved organizer for use in connection with the sun visor of a vehicle comprising:
    a bracket assembly adapted to be affixed to said sun visor,
    a panel, said panel being joined to said bracket by hinge means between said bracket and said panel, said hinge means permitting said panel to be folded to be substantially juxtaposed with respect to said visor in a first position, and unfolded to a second position where said panel makes an angle with respect to the plane of said visor, and
    at least one useful article supported on said panel,
    wherein said panel is transparent, and
    wherein said transparent panel is effective to filter the harmful effects of sunlight and reduce glare thereby permitting said panel to be used as a supplemental sun visor in the unfolded position
    wherein said at least one useful article is selected from the group consisting of writing instruments, a holder for business cards, a note pad, and a battery powered calculator.

2. The invention of claim 1 wherein said bracket assembly comprises a longitudinally extending channel integrally joined at one end to said hinge means, said channel extending rearwardly with respect to said hinge means to form a pocket for slidably receiving the sun visor of said vehicle with the hinge means reposing on one side of said sun visor, said channel further having at least one clip member downwardly depending therefrom whereby said clip member engages the other side of said sun visor when said sun visor is slidably received in said bracket assembly.

3. The invention of claim 1 further comprising a first supplemental panel, and a second hinge means for connecting said first supplemental panel to said panel whereby said supplemental panel may be folded about an axis parallel to said panel to lie juxtaposed with respect to said panel.

4. The invention of claim 3 wherein said panel has a rectangular shape defining a longitudinal extent and a transverse extent, said panel being foldable relative to said sun visor about an axis parallel to said transverse extent, and said supplemental panel being foldable relative to said panel about an axis parallel to said longitudinal extent.

5. A new and improved organizer for use in connection with the sun visor of a vehicle comprising:
    a bracket assembly adapted to be affixed to said sun visor,
    a panel, said panel being joined to said bracket by hinge means between said bracket and said panel, said hinge means permitting said panel to be folded to be substantially juxtaposed with respect to said visor in a first position, and unfolded to a second position where said panel makes an angle with respect to the plane of said visor, and
    at least one useful article supported on said panel,
    further comprising a first supplemental panel, and a second hinge means for connecting said first supplemental panel to said panel whereby said supplemental panel may be folded about an axis parallel to said panel to lie juxtaposed with respect to said panel,
    wherein said panel has a rectangular shape defining a longitudinal extent and a transverse extent, said panel being foldable relative to said sun visor about an axis parallel to said transverse extent, and said supplemental panel being foldable relative to said panel about an axis parallel to said longitudinal extent, and
    further comprising a second supplemental panel, second supplemental hinge means for connecting said second supplemental panel to said first supplemental panel whereby said second supplemental panel may be folded to lie juxtaposed with respect to said first supplemental panel.

6. The invention of claim 5 wherein said first and said second supplemental panels are rectangular in shape and of substantially the same longitudinal and transverse extent as said panel, each of said first and second supplemental panels having a pair of opposed longitudinal edges, one of the longitudinal edges of said first supplemental panel being attached to a longitudinal edge of said panel by said first supplemental hinge means, and the other longitudinal edge of said first supplemental panel being attached to a longitudinal edge of said second supplemental panel by said second supplemental hinge means.

7. The invention of claim 5 wherein said first supplemental panel has indicia displayed thereon representing the days of a month.

8. The invention of claim 7 wherein said second supplemental panel has indicia thereon representing the days of an annual calendar.

9. The invention of claim 8 further including mounting means on said second supplemental panel for supporting a marking pen there 10. The invention of claim 8 further comprising mounting means on said second supplemental panel, said mounting means adapted to support a dispenser for a cleaning solution capable of removing markings on said first or said second supplemental panels.

* * * * *